(12) United States Patent
Maeda

(10) Patent No.: US 12,113,219 B2
(45) Date of Patent: Oct. 8, 2024

(54) REDUCED GRAPHENE OXIDE-GRAPHITE COMPOSITE MATERIAL, METHOD FOR PRODUCING SAME, AND LITHIUM ION SECONDARY BATTERY USING SAME

(71) Applicant: NEC Corporation, Tokyo (JP)

(72) Inventor: Katsumi Maeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 585 days.

(21) Appl. No.: 17/421,361

(22) PCT Filed: Jan. 8, 2020

(86) PCT No.: PCT/JP2020/000291
§ 371 (c)(1),
(2) Date: Jul. 7, 2021

(87) PCT Pub. No.: WO2020/145298
PCT Pub. Date: Jul. 16, 2020

(65) Prior Publication Data
US 2021/0399300 A1    Dec. 23, 2021

(30) Foreign Application Priority Data
Jan. 9, 2019  (JP) ................................ 2019-001754

(51) Int. Cl.
*H01M 4/587* (2010.01)
*C01B 32/198* (2017.01)
(Continued)

(52) U.S. Cl.
CPC ........... *H01M 4/587* (2013.01); *C01B 32/198* (2017.08); *C01B 32/21* (2017.08);
(Continued)

(58) Field of Classification Search
CPC ........... H01M 2004/027; H01M 4/133; H01M 4/1393; H01M 4/362; H01M 4/364; H01M 4/583; H01M 4/587; H01M 10/0525
See application file for complete search history.

(56) References Cited

U.S. PATENT DOCUMENTS

2012/0156569 A1*  6/2012  Kia ................... H01M 10/0585
                                                    29/623.5
2013/0212879 A1    8/2013  Ogino
(Continued)

FOREIGN PATENT DOCUMENTS

CN        104617301     *   5/2015
CN        104617301 A      5/2015
(Continued)

OTHER PUBLICATIONS

International Search Report for PCT Application No. PCT/JP2020/000291, mailed on Feb. 10, 2020.
(Continued)

*Primary Examiner* — Matthew W Van Oudenaren
(74) *Attorney, Agent, or Firm* — Sughrue Mion, PLLC

(57) ABSTRACT

An object of the present invention is to provide a reduced graphene oxide-graphite composite material capable of improving battery characteristics such as the charge and discharge efficiency and the capacity retention ratio of a lithium ion secondary battery, and a method for producing the same. The present invention relates to a reduced graphene oxide-graphite composite material in which a reduced graphene oxide and a graphite are formed into a composite, wherein the functional group ratio (C—O/C=O) between C—O bond and C=O bond is 3 to 6 as obtained from a C1s spectrum based on surface analysis measured by X-ray photoelectron spectroscopy (XPS).

7 Claims, 1 Drawing Sheet

(51) Int. Cl.
*C01B 32/21* (2017.01)
*H01M 4/02* (2006.01)
*H01M 10/0525* (2010.01)
*H01M 10/0566* (2010.01)

(52) U.S. Cl.
CPC .. *H01M 2004/027* (2013.01); *H01M 10/0525* (2013.01); *H01M 10/0566* (2013.01); *H01M 2300/0017* (2013.01)

(56) References Cited

U.S. PATENT DOCUMENTS

2013/0337320 A1    12/2013   Yukawa
2017/0114263 A1*   4/2017   Zhamu ............... C09K 5/14
2018/0290891 A1*   10/2018   Gong ............... H01G 11/86

FOREIGN PATENT DOCUMENTS

| | | |
|---|---|---|
| CN | 107022345 A | 8/2017 |
| JP | 2013191552 A | 9/2013 |
| JP | 2014199793 A | 10/2014 |
| WO | 2017029692 A1 | 2/2017 |

OTHER PUBLICATIONS

Jiao et al., "Improved Lithium Storage Properties of the Reduced Graphene Oxide/Graphite Composites Based on Functional Groups Control Synthesis", International Journal of Electrochemical Science, Nov. 30, 2018, pp. 848-860, vol. 14.

Zhang et al., "Graphite/graphene oxide composite as high capacity and binder-free anode material for lithium ion batteries", Journal of Power Sources, May 13, 2013, pp. 619-626, vol. 241.

* cited by examiner

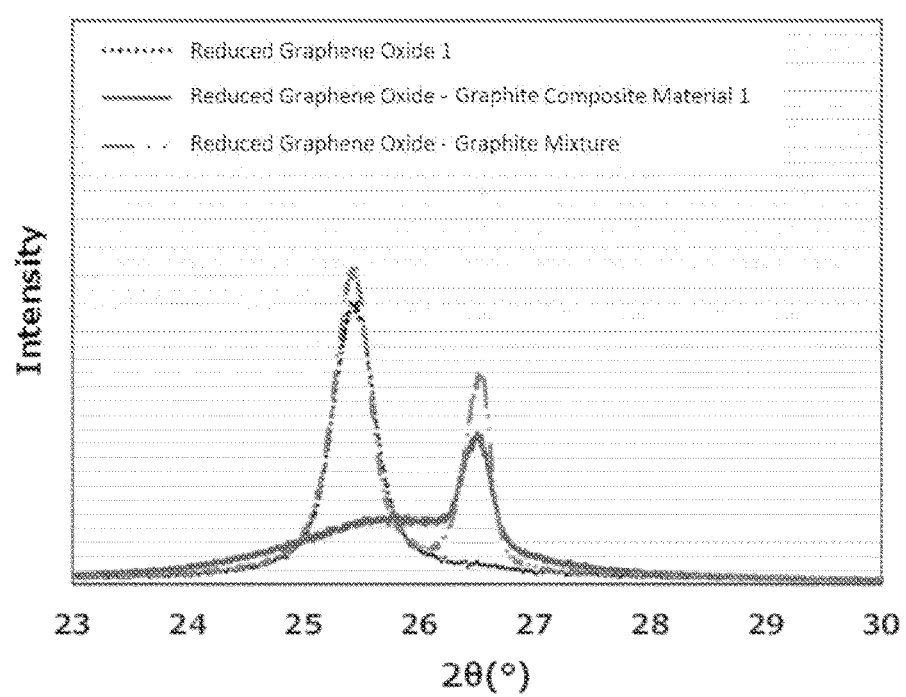

REDUCED GRAPHENE OXIDE-GRAPHITE COMPOSITE MATERIAL, METHOD FOR PRODUCING SAME, AND LITHIUM ION SECONDARY BATTERY USING SAME

This application is a National Stage Entry of PCT/JP2020/000291 filed on Jan. 8, 2020, which claims priority from Japanese Patent Application 2019-001754 filed on Jan. 9, 2019, the contents of all of which are incorporated herein by reference, in their entirety.

TECHNICAL FIELD

The present invention relates to a reduced graphene oxide-graphite composite material, a method for producing the same, and a lithium ion secondary battery using the same.

BACKGROUND ART

Lithium ion secondary batteries have been already put into practical use as batteries for small electronic devices such as laptop computers and cellular phones and the like because of their advantages of being high in energy density, low in self-discharge, excellent in long-term reliability and the like. In recent years, the development of lithium ion secondary batteries for electric vehicles, household storage batteries and power storage has been progressing.

In the lithium ion secondary batteries, carbon materials are generally used as a negative electrode active material, and various carbon materials have been proposed for improving battery characteristics. As the carbon materials, high-crystalline carbons such as natural graphite and artificial graphite, low-crystalline carbons such as easily graphitizable carbon (soft carbon) and hardly graphitizable carbon (hard carbon), amorphous carbon, and the like are known.

In such lithium ion secondary batteries, high energy density is demanded, and materials having a high energy density are demanded not only for positive electrode active materials but also for negative electrode active materials. For example, Patent Document 1 discloses a secondary battery using, as a negative electrode active material, a reduced graphene oxide obtained by thermally reducing a graphene oxide, and Patent Document 2 discloses a negative electrode made of a mixture of silicon and a reduced graphene oxide.

However, in the lithium ion secondary batteries using a reduced graphene oxide as a negative electrode active material, the initial charge and discharge efficiency is low and the irreversible capacity of the battery is large, which decreases the battery capacity that can be actually used. Hence, the improvement of the initial charge and discharge efficiency is required.

CITATION LIST

Patent Document
Patent Document 1: International Publication No. WO2017/029692
Patent Document 2: Japanese Patent Laid-Open No. 2013-191552

SUMMARY OF INVENTION

Technical Problem

An object of the present invention is to provide a reduced graphene oxide-graphite composite material capable of improving battery characteristics, such as the charge and discharge efficiency and the capacity retention ratio, of a lithium ion secondary battery, and a method for producing the same.

Solution to Problem

A first embodiment of the present invention is a reduced graphene oxide-graphite composite material in which a reduced graphene oxide and a graphite are formed into a composite, wherein the functional group ratio (C—O/C=O) between C—O bond and C=O bond is 3 to 6 as obtained from a C1s spectrum based on surface analysis as measured by X-ray photoelectron spectroscopy (XPS).

A second embodiment of the present invention is a method for producing a reduced graphene oxide-graphite composite material, the method comprising a step of thermally treating a graphene oxide together with a graphite.

A third embodiment of the present invention is a lithium ion secondary battery comprising a positive electrode comprising a positive electrode active material capable of absorbing and desorbing lithium ions, a negative electrode comprising a negative electrode active material capable of absorbing and desorbing lithium ions, and a nonaqueous electrolyte solution, wherein the negative electrode active material comprises a reduced graphene oxide-graphite composite material.

Advantageous Effects of Invention

In the lithium ion secondary battery of the present invention, a negative electrode active material comprises a reduced graphene oxide-graphite composite material, and as a result of that, a high capacity is retained and the initial charge and discharge efficiency is improved. Hence, the use efficiency of the lithium ion secondary battery can be improved, even if the battery has a high capacity.

BRIEF DESCRIPTION OF DRAWING

FIG. 1 is XRD spectra of a reduced graphene oxide, a reduced graphene oxide-graphite composite material and a reduced graphene oxide-graphite mixture.

DESCRIPTION OF EMBODIMENTS

Hereinafter, embodiments to carry out the present invention will be described. However, although technically preferable limitations in order to carry out the present invention are described in the following, the scope of the present invention is not limited to the following.

As a result of exhaustive studies in order to solve the above problem, the present inventor found that by using a reduced graphene oxide-graphite composite material obtained by subjecting a graphene oxide and a graphite together to a thermal reduction treatment for a negative electrode, the initial charge and discharge efficiency of a lithium ion secondary battery can be improved, and the present invention was thereby completed.

The details of the reasons why the use of a reduced graphene oxide-graphite composite material improves the charge and discharge efficiency, but it is conceivable that, for example, when a graphene oxide and a graphite are thermally treated together, the proportion of reductively removed carbonyl groups (C=O) becomes larger than the case where the graphene oxide is thermally treated alone. Side reactions on the surface of the negative electrode active material by the carbonyl groups are suppressed and the irreversible capacity is lowered. Hence, the initial charge and discharge efficiency is improved.

Hereinafter, there will be described in detail a reduced graphene oxide-graphite composite material and a lithium ion secondary battery according to the present embodiments.

<Reduced Graphene Oxide-Graphite Composite Material>

Graphene is a sheet of sp2-bonded carbon atoms having a thickness of one atom. By oxidatively treating graphene, the graphene can be made into a graphene oxide containing oxygen functional groups such as hydroxyl group, epoxy group and carboxyl group, and having defects. A reduced graphene oxide is a material obtained by reductively treating the graphene oxide. By the reduction treatment, oxygen functional groups such as hydroxyl group, epoxy group and carboxyl group are removed, but are usually not completely removed and partially remain. Therefore, the reduced graphene oxide also has oxygen functional groups and defects, but not as much as the graphene oxide. The graphene oxide and the reduced graphene oxide described herein may have a structure in which a plurality of graphene layers are laminated, and in this case, the number of the layers are, for example, in the range of 2 to 20 layers, 2 to 10 layers or the like.

The reduced graphene oxide-graphite composite material according to an embodiment of the present invention comprises a reduced graphene oxide and a graphite. The reduced graphene oxide-graphite composite material is obtained by subjecting a graphene oxide and a graphite to a thermal reduction treatment together. The graphene oxide contains oxygen-containing functional groups such as hydroxyl group, epoxy group and carboxyl group, has defects, and can be synthesized by a conventionally known method such as the Hammers method or the Brodie method. The graphene oxide can be synthesized, for example, by oxidizing artificial graphite, natural graphite, or the like with an oxidizing agent such as potassium permanganate or potassium chlorate in a strong acid such as sulfuric acid or fuming nitric acid.

The reduced graphene oxide-graphite composite material is produced, for example, by further dispersing a graphite in a solution in which a graphene oxide is dispersed, and homogeneously dispersing and mixing the resultant by ultrasonic treatment or the like, and after distilling away the solvent, reducing the graphene oxide by a thermal treatment to obtain a composite material of the reduced graphene oxide and the graphite. The mass ratio of the reduced graphene oxide and the graphite in the reduced graphene oxide-graphite composite material is not especially limited, and is, for example, 90:10 to 20:80 and preferably 80:20 to 40:60. The solvent to disperse the graphene oxide includes water, ethanol, methanol and N-methyl-2-pyrrolidone and the like. The temperature of the thermal treatment is preferably 300° C. to 900° C. and more preferably 400° C. to 800° C. It is preferable that the thermal treatment is carried out in vacuum, or in an inert gas flow of nitrogen, argon or the like. In a thermal treatment at lower than 300° C., the reduction of the graphene oxide is not sufficient, and when applied to a lithium ion secondary battery, there arises such a drawback that the irreversible capacity becomes high. On the other hand, in a thermal treatment at higher than 900° C., the reduction of the graphene oxide excessively progresses, which reduces the amount of oxygen atoms contained in the reduced graphene oxide, and when applied to a lithium ion secondary battery, there arises such a drawback that the discharge capacity becomes lower.

The detail of the chemical state of the reduced graphene oxide-graphite composite material is not known, but as a result of analysis by X-ray photoelectron spectroscopy (XPS), it was found that when subjecting the graphene oxide and the graphite to a thermal reduction treatment together, the ratio of C—O bond/C═O bond becomes higher than the case where only the graphene oxide is subjected to a thermal reduction treatment. The functional group ratio (C—O/C═O) between C—O bond and C═O bond as obtained from a C1s spectrum based on surface analysis of the reduced graphene oxide-graphite composite material measured by X-ray photoelectron spectroscopy (XPS) is 3 or higher, preferably 3.5 or higher and more preferably 5 or higher. The functional group ratio (C—O/C═O) between C—O bond and C═O bond as obtained from a C1s spectrum based on surface analysis of the reduced graphene oxide-graphite composite material measured by X-ray photoelectron spectroscopy (XPS) is 10 or lower, preferably 8 or lower and more preferably 6 or lower. The functional group ratio based on surface analysis of the reduced graphene oxide-graphite composite material measured by X-ray photoelectron spectroscopy (XPS) indicates a molar ratio of functional groups or bonds detected.

The reduced graphene oxide-graphite composite material has a structure different from those of reduced graphene oxide or graphite which are not formed into a composite. An XRD spectrum of the reduced graphene oxide-graphite composite material has a peak (1) at a diffraction angle (2θ) of 26° to 27° and further has a broad peak (2) at a diffraction angle (2θ) of 25° to 27°. The ratio of the peak intensity of the peak (2) to the peak intensity of the peak (1) is usually 0.8 or lower and in detail 0.6 or lower. The ratio of the peak intensity of the peak (2) to the peak intensity of the peak (1) is usually 0.1 or higher and in detail 0.3 or higher.

<Lithium Ion Secondary Battery>

<Negative Electrode>

As a negative electrode of the lithium ion secondary battery according to the present invention, there can be used, for example, a negative electrode in which a negative electrode active material layer comprising a negative electrode active material and a binding agent is formed so as to cover a negative electrode current collector. The binding agent binds between the negative electrode active material and the current collector, and binds the negative electrode active materials to each other.

The negative electrode active material comprises at least the above reduced graphene oxide-graphite composite material, and may additionally further comprise carbonaceous materials capable of absorbing and desorbing lithium ions. Examples of such carbonaceous materials include carbonaceous materials such as graphite (artificial graphite, natural graphite), carbon black (acetylene black, furnace black), coke, mesocarbon microbeads, hard carbon, graphite and the like. These can be used in any combinations and in any ratios. In order to increase the discharge capacity of the lithium ion secondary battery, the content of the reduced graphene oxide-graphite composite material in the negative electrode active material is preferably 10% by mass or more, and may be 40% by mass or more and may be even 100% by mass.

Further, a material comprising silicon (for example, silicon or a silicon oxide) can be preferably used as the negative electrode active material.

The amount of the negative electrode active material in the negative electrode active material layer is not especially limited, and may suitably be determined. The amount of the negative electrode active material in the negative electrode active material layer may be, for example, 75% by mass or more, or 85% by mass or more. The amount of the negative electrode active material in the negative electrode active material layer may be, for example, 99% by mass or less, or 95% by mass or less.

The negative electrode binding agent is not especially limited, and there can be used, for example, polyvinylidene fluoride, a vinylidene fluoride-hexafluoropropylene copolymer, a vinylidene fluoride-tetrafluoroethylene copolymer, styrene-butadiene copolymer rubber (SBR), polytetrafluoroethylene, polypropylene, polyethylene, polyimide, polyamide-imide, a polyacrylic acid (including a lithium salt, a sodium salt or a potassium salt), or a carboxymethylcellulose (including a lithium salt, a sodium salt or a potassium salt). From the viewpoint of the binding force and the energy density which are in a tradeoff relation, the amount of the negative electrode binding agent to be used is preferably 5 parts by mass to 25 parts by mass with respect to 100 parts by mass of the negative electrode active material.

The negative electrode current collector is not especially limited, and any one which is usually used for usual lithium ion secondary batteries can be used. As a material of the negative electrode current collector, for example, metal materials such as copper, nickel or SUS can be used. Among these, copper is especially preferable from the viewpoint of easy processability and costs. It is preferable that the negative electrode current collector is subjected to a surface-roughening treatment in advance. The shape of the negative electrode current collector includes foil shapes, plate shapes, mesh shapes and the like. A negative electrode current collector of a perforated type such as an expanded metal or a punching metal can also be used.

The negative electrode can be produced, for example, by kneading the negative electrode active material, the negative electrode binding agent and as required, various auxiliary agents with a solvent to prepare a slurry, applying the slurry on the negative electrode current collector and then drying and as required, pressing the resultant.

<Positive Electrode>

A positive electrode of the lithium ion secondary battery is constituted such that a positive electrode active material is bound by a positive electrode binding agent so as to cover a positive electrode current collector.

As the positive electrode active material, there can be used a lithium transition metal composite oxide containing a transition metal(s) such as cobalt, manganese or nickel, and lithium.

Such a lithium transition metal composite oxide specifically includes $LiCoO_2$, $LiMnO_2$, $LiMn_2O_4$, $LiNiO_2$, $LiCo_{1-x}Ni_xO_2$ ($0.01<x<1$), $LiNi_{1/2}Mn_{3/2}O_4$, $LiNi_xCo_yMn_zO_2$ ($x+y+z=1$), $LiNi_{0.5}Mn_{1.5}O_4$ and $LiFePO_4$ and the like. In addition, those having excessive Li more than the stoichiometric composition in these lithium transition metal composite oxides can also be included. Li-excess transition metal composite oxide includes $Li_{1+a}Ni_xMn_yO_2$ ($0<a\leq0.5$, $0<x<1$, $0<y<1$), $Li_{1+a}Ni_xMn_yM_zO_2$ ($0<a\leq0.5$, $0<x<1$, $0<y<1$, $0<z<1$, and M is Co or Fe), $Li_\alpha Ni_\beta Co_\gamma Al_\delta O_2$ ($1\leq\alpha\leq1.2$, $\beta+\gamma+\delta=1$, $\beta\geq0.7$, $\gamma\leq0.2$) and the like.

Further, for improving the cycle characteristic and the safety, and making possible the use at a high charge potential, part of the lithium transition metal composite oxide may be substituted by other elements. For example, part of cobalt, manganese and nickel can be substituted by at least one or more elements of Sn, Mg, Fe, Ti, Al, Zr, Cr, V, Ga, Zn, Cu, Bi, Mo, La and the like, or part of oxygen can be substituted by S or F, or the positive electrode surface can also be covered with a compound containing these elements.

Examples of specific compositions of the lithium transition metal composite oxide of the present embodiment include $LiMnO_2$, $LiCoO_2$, $LiNiO_2$, $LiMn_2O_4$, $LiCo_{0.8}Ni_{0.2}O_2$, $LiNi_{1/2}Mn_{3/2}O_4$, $LiNi_{1/3}Co_{1/3}Mn_{1/3}O_2$ (abbreviated to NCM111), $LiNi_{0.4}Co_{0.3}Mn_{0.3}O_2$ (abbreviated to NCM433), $LiNi_{0.5}Co_{0.2}Mn_{0.3}O_2$ (abbreviated to NCM523), $LiNi_{0.5}Co_{0.3}Mn_{0.2}O_2$ (abbreviated to NCM532), $LiFePO_4$, $LiNi_{0.8}Co_{0.15}Al_{0.05}O_2$, $LiNi_{0.8}Co_{0.1}Mn_{0.1}O_2$, $Li_{1.2}Mn_{0.4}Ni_{0.4}O_2$, $Li_{1.2}Mn_{0.6}Ni_{0.2}O_2$, $Li_{1.19}Mn_{0.52}Fe_{0.22}O_{1.98}$, $Li_{1.21}Mn_{0.46}Fe_{0.15}Ni_{0.15}O_2$, $LiMn_{1.5}Ni_{0.5}O_4$, $Li_{1.2}Mn_{0.4}Fe_{0.4}O_2$, $Li_{1.21}Mn_{0.4}Fe_{0.2}Ni_{0.2}O_2$, $Li_{1.26}Mn_{0.37}Ni_{0.22}Ti_{0.15}O_2$, $LiMn_{1.37}Ni_{0.5}Ti_{0.13}O_{4.0}$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.5}Mn_{1.45}Al_{0.05}O_{3.9}F_{0.05}$, $LiNi_{0.4}Co_{0.2}Mn_{1.25}Ti_{0.15}O_4$, $Li_{1.23}Fe_{0.15}Ni_{0.15}Mn_{0.4602}$, $Li_{1.26}Fe_{0.11}Ni_{0.11}Mn_{0.52}O_2$, $Li_{1.2}Fe_{0.20}Ni_{0.20}Mn_{0.40}O_2$, $Li_{1.29}Fe_{0.07}Ni_{0.14}Mn_{0.57}O_2$, $Li_{1.26}Fe_{0.22}Mn_{0.37}Ti_{0.15}O_2$, $Li_{1.29}Fe_{0.07}Ni_{0.07}Mn_{0.57}O_{2.8}$, $Li_{1.30}Fe_{0.04}Ni_{0.07}Mn_{0.61}O_2$, $Li_{1.2}Ni_{0.18}Mn_{0.54}Co_{0.08}O_2$, $Li_{1.23}Fe_{0.03}Ni_{0.03}Mn_{0.58}O_2$ and the like.

The lithium transition metal composite oxide as described above may be used as a mixture of two or more, for example, NCM532 or NCM523 and NCM433 can be used by mixing them in the range of 9:1 to 1:9 (as a typical example, 2:1), or NCM532 or NCM523 and $LiMnO_2$, $LiCoO_2$ or $LiMn_2O_4$ can also be used by mixing them in the range of 9:1 to 1:9.

A method for synthesizing the lithium transition metal composite oxides represented by the above chemical formulae is not especially limited, and conventionally known synthesis methods of oxides can be applied.

For the purpose of lowering the impedance, a conductive auxiliary agent may be added to a positive electrode active material layer comprising the positive electrode active material. Examples of the conductive auxiliary agent include graphites such as natural graphite and artificial graphite, and carbon blacks such as acetylene black, Ketjen black, furnace black, channel black and thermal black. The conductive auxiliary agent may also be used by suitably mixing a plurality of kinds thereof. The amount of the conductive auxiliary agent is preferably 1% by mass to 10% by mass with respect to 100% by mass of the positive electrode active material.

The positive electrode binding agent is not especially limited, and examples thereof include polyvinylidene fluoride, vinylidene fluoride-hexafluoropropylene copolymers, vinylidene fluoride-tetrafluoroethylene copolymers and the like. Further, styrene-butadiene copolymer rubber, polytetrafluoroethylene, polypropylene, polyethylene, polyimide, polyamide-imide or the like may also be used as the positive electrode binding agent. In particular, from the viewpoint of versatility and lowering cost, it is preferable to use polyvinylidene fluoride as the positive electrode binding agent. The amount of the positive electrode binding agent to be used is, from the viewpoint of "sufficient binding force" and "high energy" which are in a tradeoff relation, preferably 2 parts by mass to 10 parts by mass with respect to 100 parts by mass of the positive electrode active material.

As the positive electrode current collector, any usual one can be used, and for example, an aluminum foil or a stainless steel lath board can be used.

The positive electrode can be fabricated, for example, by adding a solvent such as N-methylpyrrolidone to a mixture of the positive electrode active material, the conductive auxiliary agent and the positive electrode binding agent and kneading them, and applying the kneaded mixture on the positive electrode current collector by a doctor blade method, a die coater method or the like, and drying the resultant.

<Nonaqueous Electrolyte Solution>

A nonaqueous electrolyte solution of the lithium ion secondary battery is constituted mainly of a nonaqueous solvent and an electrolyte.

Examples of the nonaqueous solvent include cyclic carbonates, chain carbonates, chain esters, lactones, ethers, sulfones, nitriles and phosphate esters, cyclic carbonates and the like, and chain carbonates are preferable.

Specific examples of the cyclic carbonates include propylene carbonate, ethylene carbonate, butylene carbonate, vinylene carbonate, vinylethylene carbonate and the like.

Specific examples of the chain carbonates include dimethyl carbonate, diethyl carbonate, dipropyl carbonate, dibutyl carbonate and the like. Specific examples thereof also include ethyl methyl carbonate, methyl propyl carbonate, methyl isopropyl carbonate, methyl butyl carbonate and the like.

Specific examples of the chain esters include methyl formate, methyl acetate, methyl propionate, ethyl propionate, methyl pivalate, ethyl pivalate and the like.

Specific examples of the lactones include γ-butyrolactone, δ-valerolactone, α-methyl-γ-butyrolactone and the like.

Specific examples of the ethers include tetrahydrofuran, 2-methyltetrahydrofuran, 1,3-dioxolane, 1,3-dioxane, 1,4-dioxane, 1,2-dimethoxyethane, 1,2-diethoxyethane, 1,2-dibutoxyethane and the like.

Specific examples of the sulfones include sulfolane, 3-methylsulfolane, 2,4-dimethylsulfolane and the like.

Specific examples of the nitriles include acetonitrile, propionitrile, succinonitrile, glutaronitrile, adiponitrile and the like.

Specific examples of the phosphate esters include trimethyl phosphate, triethyl phosphate, tributyl phosphate, trioctyl phosphate and the like.

The above nonaqueous solvent can be used singly or in a combination of two or more. Examples of combinations of a plurality of nonaqueous solvents include combinations of a cyclic carbonate(s) with a chain carbonate(s). By using a nonaqueous solvent comprising a cyclic carbonate(s) and a chain carbonate(s), excellent battery characteristics can be realized.

To a combination of a cyclic carbonate(s) with a chain carbonate(s), a nonaqueous solvent such as a fluorinated ether solvent, a fluorinated carbonate solvent, a fluorinated phosphate ester and the like may further be added.

Specific examples of the fluorinated ether solvent include $CF_3OCH_3$, $CF_3OC_2H_5$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CF_2)_4CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2CH_2OCH_2CF_2CF_3$, $H(CF_2)_2CH_2OCF_2CHFCF_3$, $CHF_2CH_2OCF_2CFHCF_3$, $F(CF_2)_2CH_2OCF_2CFHCF_3$, $CF_3(CF_2)_3OCHF_2$ and the like.

Examples of the fluorinated carbonate solvent include fluoroethylene carbonate, fluoromethyl methyl carbonate, 2-fluoroethyl methyl carbonate, ethyl-(2-fluoroethyl) carbonate, (2,2-difluoroethyl) ethyl carbonate, bis(2-fluoroethyl) carbonate, ethyl-(2,2,2-trifluoroethyl) carbonate and the like.

Examples of the fluorinated phosphate ester include tris (2,2,2-trifluoroethyl) phosphate, tris(trifluoromethyl) phosphate and tris(2,2,3,3-tetrafluoropropyl) phosphate and the like.

Specific examples of the electrolyte can include lithium salts such as lithium hexafluorophosphate ($LiPF_6$), lithium bis(fluorosulfonyl)imide [$LiN(SO_2F)_2$], $LiBF_4$, $LiClO_4$, $LiN(SO_2CF_3)_2$, $LiN(SO_2C_2F_5)_2$, $CF_3SO_3Li$, $C_4F_9SO_3Li$, $LiAsF_6$, $LiAlCl_4$, $LiSbF_6$, $LiPF_4(CF_3)_2$, $LiPF_3(C_2F_5)_3$, $LiPF_3(CF_3)_3$, $(CF_2)_2(SO_2)_2NLi$, $(CF_2)_3(SO_2)_2Li$, lithium bis (oxalato)borate ($LiC_4BO_8$), lithium difluoro(oxalato)borate [$LiBF_2(C_2O_4)$] and the like. These lithium salts can be used singly or in a combination of two or more. It is especially preferable to comprise $LiPF_6$ and $LiN(SO_2F)_2$. $LiN(SO_2F)_2$ can improve the charge rate characteristic. On the other hand, $LiN(SO_2F)_2$ has such a problematic point that when it is used singly, it corrodes aluminum of the positive electrode current collector. Hence, it is preferable to use both of $LiPF_6$ and $LiN(SO_2F)_2$, and in this case, the corrosion of aluminum can be suppressed while retaining the high charge rate characteristic by using $LiPF_6$ at a concentration of 0.3M or higher in the electrolyte solution.

The concentration of the electrolyte dissolved in the nonaqueous electrolyte solution is preferably in the range of 0.3 mol/L to 3 mol/L, and more preferably in the range of 0.5 mol/L to 2 mol/L. When the concentration of the electrolyte is 0.3 mol/L or higher, a more sufficient ionic conductivity can be attained. When the concentration of the electrolyte is 3 mol/L or lower, the increase in the viscosity of the electrolyte solution is suppressed and a more sufficient ionic mobility and impregnability can be attained.

<Separator>

A separator is not especially limited, and there can be used a monolayer or laminated porous film or nonwoven fabric made of a resin material such as a polyolefin such as polypropylene or polyethylene. There can also be used a film in which a dissimilar material is coated or laminated on a resin layer of a polyolefin or the like. Examples of such a film include a film in which a polyolefin base material is coated with a fluorine compound or inorganic microparticles, and a film in which an aramid layer is laminated on a polyolefin base material.

From the viewpoint of the energy density of the battery and the mechanical strength of the separator, the thickness of the separator is preferably 5 μm to 50 μm and more preferably 10 μm to 40 μm.

<Structure of the Lithium Ion Secondary Battery>

The form of the lithium ion secondary battery is not especially limited, and includes a coin-type battery, a button-type battery, a cylinder-type battery, a rectangular battery, a laminate-type battery and the like.

For example, the laminate-type battery can be fabricated by alternately laminating the positive electrode, the separator and the negative electrode to form a laminate body, connecting metal terminals called tabs to each electrodes, putting the laminate body in a container as outer package made of a laminate film, and injecting the electrolyte solution and sealing the resultant.

The laminate film can suitably be selected as long as having a stable and sufficient steam barrier property to the electrolyte solution. As such a laminate film, for example, a laminate film made of a polyolefin (for example, polypropylene, polyethylene) coated with an inorganic material such as aluminum, silica or alumina can be used. In particular, from the viewpoint of suppressing the volume expansion, an aluminum laminate film made of polyolefin coated with aluminum is preferable.

The typical layer structure of the laminate film includes a structure in which a metal thin film layer and a heat-fusible resin layer are laminated. On the surface of the metal thin film layer on the opposite side to the heat-fusible resin layer side, there may be further laminated a resin film (protective layer) made of polyester such as polyethylene terephthalate or polyamide such as nylon. The heat-fusible resin layers of two sheets of the laminate film are faced to each other so that the container made of the laminate films which houses the laminate body comprising the positive electrode and the negative electrode can be sealed. As the metal thin film layer of the laminate film, there is used, for example, a foil of Al, Ti, a Ti alloy, Fe, a stainless steel, a Mg alloy or the like, having a thickness of 10 μm to 100 μm. A resin to be used for the heat-fusible resin layer is not especially limited as long as it is a resin capable of heat-fusing, and examples thereof include polypropylene, polyethylene, an acid-modified product of these resins, polyphenylene sulfide, polyester such as polyethylene terephthalate, polyamide, an ethylene-vinyl acetate copolymer, or an ionomer resin obtained by intermolecular bonding an ethylene-methacrylic acid copolymer or an ethylene-acrylic acid copolymer with metal ion. The thickness of the heat-fusible resin layer is preferably 10 μm to 200 μm and more preferably 30 μm to 100 μm.

EXAMPLES

Hereinafter, the present invention will be described more specifically by way of Examples, but the present invention is not intended to be limited to these Examples.

Synthesis Example 1: A Graphene Oxide 10 g of a flake graphite powder having an average particle diameter of 20 μm was added to 100 ml of fuming nitric acid, and cooled to 0° C. 80 g of potassium chlorate was little by little added thereto, and thereafter stirred at 0° C. to 5° C. for 3 hours. Ice water was added to the reaction mixture, and a deposited precipitate was filtered out, washed with water and dried to obtain 14.5 g of a graphene oxide.

Synthesis Example 2: A Reduced Graphene Oxide 4 g of the graphene oxide obtained in Synthesis Example 1 was heated up to 280° C. over 21 hours in a nitrogen gas flow, held at 280° C. for 1 hour, thereafter heated up to 700° C. and heated at 700° C. for 1 hour to obtain 2.496 g of a reduced graphene oxide (recover amount: 62.4%).

Synthesis Example 3: A Reduced Graphene Oxide-Graphite Composite Material 1

2.568 g of the graphene oxide obtained in Synthesis Example 1 and 0.4 g of graphite were dispersed in 200 ml of ethanol, and subjected to ultrasonication treatment for 1 hour. Ethanol was distilled away by an evaporator, and an obtained mixed material of the graphene oxide and the graphite was heated up to 280° C. over 21 hours in a nitrogen gas flow, held at 280° C. for 1 hour, thereafter heated up to 700° C. and heated at 700° C. for 1 hour to obtain 2.09 g of a reduced graphene oxide-graphite composite material 1 (recovery amount: 70.4%).

Synthesis Example 4: A Reduced Graphene Oxide-Graphite Composite Material 2

2.58 g of the graphene oxide obtained in Synthesis Example 1 and 0.69 g of graphite were dispersed in 200 ml of ethanol, and subjected to ultrasonication treatment for 1 hour. Ethanol was distilled away by an evaporator, and an obtained mixed material of the graphene oxide and the graphite was heated up to 280° C. over 21 hours in a nitrogen gas flow, held at 280° C. for 1 hour, thereafter heated up to 700° C. and heated at 700° C. for 1 hour to obtain 2.366 g of a reduced graphene oxide-graphite composite material 2 (recovery amount: 72.4%).

Synthesis Example 5: A Reduced Graphene Oxide-Graphite Mixture 8 g of the reduced graphene oxide obtained in Synthesis Example 2 and 2 g of graphite were mixed to obtain a reduced graphene oxide-graphite mixture.
(XRD Analysis of the Reduced Graphene Oxide-Graphite Composite Material)

Respective powder samples of the reduced graphene oxide obtained in Synthesis Example 2, the reduced graphene oxide-graphite composite material 1 obtained in Synthesis Example 3 and the reduced graphene oxide-graphite mixture obtained in Synthesis Example 5 were measured by an X⁻ ray diffractometer (XRD) (manufactured by Philips Inc., X'PertPRO). The results are shown in FIG. 1. The reduced graphene oxide has a sharp peak at 2θ of 25° to 26°, and the reduced graphene oxide-graphite mixture has both of a peak derived from the reduced graphene oxide and a peak derived from graphite having a peak at 2θ of 26° to 27°. It can be seen that the peaks derived from the reduced graphene oxide are coincide in the reduced graphene oxide and the reduced graphene oxide-graphite mixture. By contrast, the reduced graphene oxide-graphite composite material 1 has a peak derived from graphite having a peak of 2θ at 26° to 27° and a broad peak at 2θ of 25° to 27°, thus has peaks quite different from that of the reduced graphene oxide, which indicates that it has a structure different from the reduced graphene oxide.
(XPS Analysis of the Reduced Graphene Oxide-Graphite Composite Material)

Respective surface element compositions of the reduced graphene oxide obtained in Synthesis Example 2, the reduced graphene oxide-graphite composite material 1 obtained in Synthesis Example 3, the reduced graphene oxide-graphite composite material 2 obtained in Synthesis Example 4, and the graphite used in Synthesis Example 3 and Synthesis Example 4 were measured by X-ray photoelectron spectroscopy (XPS) (apparatus: manufactured by PHI Inc., QuanteraSXM). The measurement was carried out by irradiating a sample surface with soft X-rays in ultrahigh vacuum, and detecting photoelectrons emitted from the surface by an analyzer. The proportion (%) of each functional group obtained from the detected C1s peak is indicated in Table 1.

As seen in Table 1, in the reduced graphene oxide-graphite composite materials, the C—O bond/C=O bond was 3 to 6; by contrast, in the reduced graphene oxide, the C=O bond/C—O bond was 2.3. From this result, it was found that in the reduced graphene oxide-graphite composite material of the present invention, more C=O bonds of the graphene oxide are reductively removed by the thermal reduction action of graphite.

TABLE 1

| | Results of C1s peak analysis (%) | | | |
|---|---|---|---|---|
| | COO | C = O | C-O | C-C, C = C, CHx |
| Synthesis Example 2 | 1 | 3 | 7 | 89 |
| Synthesis Example 3 | 1 | 2 | 6 | 91 |
| Synthesis Example 4 | 1 | 1 | 6 | 92 |
| Graphite | — | — | — | 100 |

Example 1

Production Example 1 of a Negative Electrode Using the Reduced Graphene Oxide-Graphite Composite Material The reduced graphene oxide-graphite composite material 1 obtained in Synthesis Example 3 (89% by mass) which was a negative electrode active material, carbon black (3% by mass), carboxymethylcellulose (5% by mass) and SBR (3% by mass) were mixed, and water was added thereto. An obtained slurry was applied on one surface of a negative electrode current collector made of a copper foil (thickness: 15 μm), and dried to form a negative electrode active material layer, and further pressed to obtain a single-side negative electrode in which the negative electrode active material layer was formed on the one surface of the negative electrode current collector.

Example 2

Production Example 2 of a Negative Electrode Using the Reduced Graphene Oxide-Graphite Composite Material The reduced graphene oxide-graphite composite material 2 obtained in Synthesis Example 4 (89% by mass) which was a negative electrode active material, carbon black (3% by mass), carboxymethylcellulose (5% by mass) and SBR (3% by mass) were mixed, and water was added thereto. An obtained slurry was applied on one surface of a negative electrode current collector made of a copper foil (thickness: 15 μm), and dried to form a negative electrode active material layer, and further pressed to obtain a single-side negative electrode in which the negative electrode active material layer was formed on the one surface of the negative electrode current collector.

Comparative Example 1

Production Example of a Negative Electrode Using the Reduced Graphene Oxide

The reduced graphene oxide obtained in Synthesis Example 2 (89% by mass), carbon black (3% by mass), carboxymethylcellulose (5% by mass) and SBR (3% by mass) were mixed, and water was added thereto. An obtained slurry was applied on one surface of a negative electrode current collector made of a copper foil (thickness: 15 μm), and dried to form a negative electrode active material layer, and further pressed to obtain a single-side negative electrode in which the negative electrode active material layer was formed on the one surface of the negative electrode current collector.

Comparative Example 2

Production Example of a Negative Electrode Using the Reduced Graphene Oxide-Graphite Mixture The reduced graphene oxide-graphite mixture obtained in Synthesis Example 5 (89% by mass), carbon black (3% by mass), carboxymethylcellulose (5% by mass) and SBR (3% by mass) were mixed, and water was added thereto. An obtained slurry was applied on one surface of a negative electrode current collector made of a copper foil (thickness: 15 μm), and dried to form a negative electrode active material layer, and further pressed to obtain a single-side negative electrode in which the negative electrode active material layer was formed on the one surface of the negative electrode current collector.

<Preparation of an Electrolyte Solution>

Ethylene carbonate (EC) and diethyl carbonate (DEC) were mixed in a volume ratio (EC/DEC) of 30/70, and $LiPF_6$ was dissolved therein to be 1 mol/L to prepare an electrolyte solution.

<Fabrication of Half Cells for Test>

Each of the negative electrodes fabricated by the above methods and a Li foil were formed into a predetermined shape, and thereafter, laminated with a porous film separator interposed therebetween, and tabs were welded to each of them to obtain a power generation element. The power generation element was wrapped in an outer package made of an aluminum laminate film, edge parts of three sides thereof were thermally fused, and the above electrolyte solution was then injected therein and impregnated in a suitable degree of vacuum. Thereafter, an edge part of the remaining one side was sealed by thermal fusion under reduced pressure to thereby obtain test cells of Examples 1 and 2 and test cells of Comparative Examples 1 and 2.

<Evaluation of the Half Cells>

The cells fabricated by the above method were each charged in a thermostatic chamber at 20° C. at a constant-current constant-voltage of 0.1 C to 0 V, and discharged at a constant-current of 0.1 C to 2 V. The initial charge and discharge efficiency was determined from the ratio of the discharge capacity and the charge capacity thus obtained. The results obtained are collectively shown in Table 2.

Comparing Examples 1 and 2 with Comparative Examples 1 and 2, it was found that the initial charge and discharge efficiency was improved in the cells using the reduced graphene oxide-graphite composite material.

TABLE 2

| | Initial charge and discharge efficiency (%) |
|---|---|
| Example 1 | 56 |
| Example 2 | 58 |
| Comparative Example 1 | 51 |
| Comparative Example 2 | 54 |

<Fabrication of a Positive Electrode>

$LiNi_{0.8}Co_{0.15}Al_{0.05}O_2$ as a positive electrode active material, a carbon black as a conductive auxiliary agent, and a polyvinylidene fluoride as a binding agent for positive electrode were weighed in a mass ratio of 94:3:3, and mixed with N-methylpyrrolidone to prepare a positive electrode slurry. Thereafter, the positive electrode slurry was applied on one surface of a positive electrode current collector made of an aluminum foil of 20 μm in thickness, dried to form a positive electrode active material layer, and further pressed to thereby fabricate a positive electrode.

<Preparation of an Electrolyte Solution>

Ethylene carbonate (EC) and diethyl carbonate (DEC) were mixed in a volume ratio (EC/DEC) of 30/70, and LiPF$_6$ was dissolved therein to be 1 mol/L to prepare an electrolyte solution.

<Fabrication of Full Cells for Test>

Each of the negative electrodes and the positive electrode fabricated by the above methods were formed into a predetermined shape, and then laminated with a porous film separator interposed therebetween, and tabs were welded to each of them to obtain a power generation element. The power generation element was wrapped in an outer package made of an aluminum laminate film, edge parts of three sides thereof were thermally fused, and the above electrolyte solution was then injected therein and impregnated in a suitable degree of vacuum. Thereafter, an edge part of the remaining one side was sealed by thermal fusion under reduced pressure to thereby obtain test cells of Examples 3 and 4 and test cells of Comparative Examples 3 and 4. Here, Example 3 used the negative electrode of Example 1, Example 4 used the negative electrode of Example 2, Comparative Example 3 used the negative electrode of Comparative Example 1, and Comparative Example 4 used the negative electrode of Comparative Example 2.

<Evaluation of the Full Cells>

The cells fabricated by the above method were each charged in a thermostatic chamber at 20° C. at a constant-current of 0.1 C and a constant-voltage to 4.2 V, and discharged at a constant-current of 0.1 C to 2 V. The initial charge and discharge efficiency was determined from the ratio of the discharge capacity and the charge capacity thus obtained. Thereafter, similarly, the cells were each charged at a constant-current of 0.1 C and a constant-voltage to 4.2 V, and discharged at a constant-current of 0.1 C to 2 V. The ratio of the second discharge capacity to the initial discharge capacity (=second discharge capacity/initial discharge capacity×100) was determined as a capacity retention ratio. The results obtained are shown collectively in Table 3.

Comparing Examples 3 and 4 with Comparative Examples 3 and 4, it was found that the cells using the reduced graphene oxide-graphite composite material were improved in the initial charge and discharge efficiency, and improved also in the capacity retention ratio, as compared to the cell using the reduced graphene oxide and the cell using the reduced graphene oxide-graphite mixture.

TABLE 3

|  | Initial charge and discharge efficiency (%) | Capacity retention ratio (%) |
| --- | --- | --- |
| Example 3 | 48 | 92 |
| Example 4 | 53 | 93 |
| Comparative Example 3 | 39 | 86 |
| Comparative Example 4 | 42 | 87 |

This application is based upon and claims the benefit of priority from Japanese patent application No. 2019-001754, filed on Jan. 9, 2019, the disclosure of which is incorporated herein in its entirety.

While the invention has been described with reference to example embodiments and examples thereof, the invention is not limited to the above example embodiments and examples. Various changes that can be understood by those skilled in the art may be made to the configuration and details of the invention within the scope of the present invention.

INDUSTRIAL APPLICABILITY

The lithium ion secondary battery using the reduced graphene oxide-graphite composite material according to the present invention has an improved initial charge and discharge efficiency and a high capacity as well, and thus can be utilized, for example, in all sorts of industrial fields requiring a power supply, and industrial fields related to transportation, storage and supply of electric energy. Specifically, the battery can be utilized as a power source for mobile devices such as mobile phones, laptop computers, tablet terminals and portable game machines. The battery can also be used as a power source for moving and transporting media such as electric vehicles, hybrid cars, electric motorcycles, electrically assisted bicycles, transporting carts, robots and drones (small unmanned aircrafts). The battery can further be utilized for a household power storage system, a backup power source such as UPS, and power storage facilities for storing electric power generated by solar power generation, wind power generation and the like.

The invention claimed is:

1. A reduced graphene oxide-graphite composite material in which a reduced graphene oxide and a graphite are formed into a composite, wherein a functional group ratio (C—O/C═O) between C—O bond and C═O bond is 3 to 6 as obtained from a C1s spectrum based on surface analysis as measured by X-ray photoelectron spectroscopy (XPS), and a mass ratio of the reduced graphene oxide and the graphite in the reduced graphene oxide-graphite composite is 90:10 to 20:80.

2. A lithium ion secondary battery comprising a positive electrode comprising a positive electrode active material capable of absorbing and desorbing lithium ions, a negative electrode comprising a negative electrode active material capable of absorbing and desorbing lithium ions, and a nonaqueous electrolyte solution, wherein the negative electrode active material comprises the reduced graphene oxide-graphite composite material according to claim 1.

3. The lithium ion secondary battery according to claim 2, wherein a content of the reduced graphene oxide-graphite composite material in the negative electrode active material is 10% by mass or more.

4. The reduced graphene oxide-graphite composite material according to claim 1, wherein a mass ratio of the reduced graphene oxide and the graphite in the reduced graphene oxide-graphite composite material is 80:20 to 40:60.

5. The reduced graphene oxide-graphite composite material according to claim 1, wherein an XRD spectrum of the reduced graphene oxide-graphite composite material has a peak (1) at a diffraction angle (2θ) of 26° to 27° and a peak (2) at a diffraction angle (2θ) of 25° to 27°, and a ratio of a peak intensity of the peak (2) to a peak intensity of the peak (1) is 0.1 or higher and 0.8 or lower.

6. The lithium ion secondary battery according to claim 2, wherein a mass ratio of the reduced graphene oxide and the graphite in the reduced graphene oxide-graphite composite material is 80:20 to 40:60.

7. The lithium ion secondary battery according to claim 2, wherein an XRD spectrum of the reduced graphene oxide-graphite composite material has a peak (1) at a diffraction angle (2θ) of 26° to 27° and a peak (2) at a diffraction angle (2θ) of 25° to 27°, and a ratio of a peak intensity of the peak (2) to a peak intensity of the peak (1) is 0.1 or higher and 0.8 or lower.

* * * * *